(12) United States Patent  
Tomlinson (10) Patent No.: US 7,471,796 B2
(45) Date of Patent: *Dec. 30, 2008

(54) APPARATUS FOR AND METHOD OF CONTROLLING PROPAGATION OF DECRYPTION KEYS

(75) Inventor: David Robin Tomlinson, Taunton (GB)

(73) Assignee: Data Encryption Systems Limited, Somerset (GB)

( * ) Notice: Subject to any disclaimer, the term of this patent is extended or adjusted under 35 U.S.C. 154(b) by 230 days.

This patent is subject to a terminal disclaimer.

(21) Appl. No.: 11/458,853

(22) Filed: Jul. 20, 2006

(65) Prior Publication Data

US 2007/0038869 A1 Feb. 15, 2007

Related U.S. Application Data

(63) Continuation-in-part of application No. 10/085,163, filed on Feb. 27, 2002, now Pat. No. 7,099,478.

(30) Foreign Application Priority Data

Sep. 5, 2001 (GB) ................................. 0121502.9

(51) Int. Cl.
*H04L 9/08* (2006.01)
(52) U.S. Cl. .................... 380/280; 380/284; 726/27
(58) Field of Classification Search .................... 726/27; 380/280, 284
See application file for complete search history.

(56) References Cited

U.S. PATENT DOCUMENTS 5,534,857 A * 7/1996 Laing et al. ................. 340/5.74
5,825,876 A * 10/1998 Peterson, Jr. .................. 705/52
6,246,771 B1 * 6/2001 Stanton et al. ............... 380/286
6,847,719 B1 * 1/2005 Ballard ........................ 380/279

FOREIGN PATENT DOCUMENTS

| RU | 2040117 | 7/1995 |
| RU | 1306360 | 12/1995 |
| RU | 2145437 | 2/2000 |
| WO | 0141353 A2 | 6/2001 |
| WO | 0152017 A1 | 7/2001 |

OTHER PUBLICATIONS

English version of Russian Examination Report No. 2004107577/09.

* cited by examiner

*Primary Examiner*—Andrew L Nalven
(74) *Attorney, Agent, or Firm*—Baker & McKenzie LLP (57) ABSTRACT

A security system for controlling access to encrypted information, comprising: a memory for storing at least one decryption key for use in decrypting an encrypted item of information, the decryption key being associated with a security code which can be used to determine whether the security system is authorized to send encrypted copies of the decryption key to others. If the security system is authorized to send an encrypted copy of the decryption key, it encrypts the decryption key and propagates the encrypted copy of the decryption key. Each time the security system propagates a decryption key, it includes as part of the decryption key an identifier indicating the identity of a sender's key. A user can append a control word against their identity in the decryption key to instruct the security system to initiate a message to them or an agent informing them of the propagation of the key and giving information concerning that propagation.

22 Claims, 5 Drawing Sheets

APPARATUS FOR AND METHOD OF CONTROLLING PROPAGATION OF DECRYPTION KEYS

CROSS-REFERENCE TO RELATED APPLICATIONS

This application is a continuation-in-part of U.S. application Ser. No. 10/085,163 filed Feb. 27, 2002, entitled "Apparatus for and method of controlling propagation of decryption keys," which claims priority to U.K. Application No. 0121502.9 filed Sep. 5, 2001, the entire contents of which are hereby incorporated by reference.

FIELD OF THE INVENTION

The present invention generally relates to encryption. More particularly, the invention concerns an apparatus for and a method of controlling propagation of decryption keys or access to encrypted information.

BACKGROUND OF THE INVENTION

There is often a need to control access to data. In some computing environments this goal has been achieved by virtue of limiting the physical access to a machine, to a data carrier, or to parts of a local area network. However such systems can be unnecessarily rigid and cumbersome, especially when the class of persons to whom access may be allowed or denied to a particular item of data is ill defined.

Another approach to security is the use of encryption. In a secure system, the identities of the or each person who should have access to a document or other item of encrypted data needs to be defined at the time of encryption. This can, once again, be difficult where the class of people who should receive the data is ill defined.

Neither of these themes works particularly well in a "generally trusted" environment where absolute security is not necessary. An example of a generally trusted environment is a company where a manager may be dealing with a commercially sensitive document, and may wish to share this with other managers and in turn recognizes that they may need to share the document with other individuals where they deem this to be necessary or desirable. Thus the document cannot be "open" such that everyone can view it, as it may be commercially sensitive, but neither can the recipient list be accurately defined right from the outset.

Therefore, there exists a need for an apparatus and method of controlling encryption.

SUMMARY OF THE INVENTION

A first aspect of the invention provides a security system for controlling access to encrypted information, the security system comprising a memory for storing a decryption key for use in decrypting an encrypted item of information, the decryption key being associated with the security code which is used by the security system to determine whether it is authorized to send encrypted copies of the decryption key to others.

It is thus possible to give the originator of an item of information control over the number of times that that item of information may be passed from one person to another or how many times the decryption key can be passed from one person to another, under circumstances where the item of information is in an encrypted form.

Preferably the decryption key is related to a specific project or task. Thus the controller or originator of a task can generate a key which can be used for encryption and decryption of documents within that project or task.

Advantageously the decryption key may also include a further identifier which is unique to an entity, such as a company, so that only people having a corresponding code portion in their security device can decrypt the key for the documents.

Preferably, when a further person wishes to receive a copy of the encrypted information, the decryption key for the encrypted information is sent to that other user in an encrypted form. Advantageously the encryption key is itself encrypted with the recipient's public encryption key.

Advantageously the security system further modifies the security code each time it sends the decryption key to another user. It is thus possible to keep a track on the number of times the decryption key is propagated from one person to another. This security code may, for example, be a "generation limit" set by the originator of the document, and each time the decryption key is propagated, the generation limit is decremented. Once the generation limit reaches zero, further propagation of the decryption key is inhibited by the hardware device.

Advantageously the decryption key is further associated with a security device and/or user identity number and/or key file registration number which is unique. Each time the decryption key is propagated, the identity of the user or security device or key file which authorized the propagation of the decryption key may be added to the decryption key. It is thus possible for an audit trail to be identified which shows the path through which a decryption key has passed. The identity may overwrite a previous identity or be appended to a list of identities. The list may be stored in the security device or elsewhere, such as a log file in a user's computer.

Advantageously, when propagating a decryption key to a further user, the person authorizing the propagation may have the ability to modify the generation limit, so as to decrement it. A person authorizing the propagation of the key, or the originator, may also be able to set one or more control words or control flags such that the security system is instructed to send a message to that person when an attempt to further propagate the key is initiated. Indeed, the further propagation of the decryption key may be inhibited until such time as that person sends a return message to the security device authorizing the further propagation of key. Thus it is possible to set the security system such that it automatically generates an audit trail and/or such that it seeks further authority from a manager when sending further copies of the decryption key, which copies still represent "generations" of the key which are within the limit authorized by the "generation limit".

The authority to send the key may be generated automatically by an agent on a server which keeps a control log of propagations.

In a first embodiment of the invention, the security system is implemented by a security device which interfaces with a further device permanently embedded within a computer, or software loaded or embedded within the computer such that attempts to access a secure document without the proper decryption key results in a message being sent back to a system administrator, or the author of the document, or some other person defined by a suitable security field included within the document or included within a security file associated with the document. The file associated with the document may itself be encrypted.

Advantageously the security device is in the form of a small unit which the user can carry with them and which is dockable and undockable with a data processor, for example a standard PC, portable computing device and so on having a suitable socket. Thus, the security device effectively functions as a dongle, but is not to be confused with the old style dongles which were hardware devices permanently connected to the printer port of a computer. Wireless communication is also possible.

The security device may be password protected. Advantageously it can be set to disable after a number of incorrect entries of the password.

In a second embodiment of the invention, instead of using a hardware security device which interfaces with a computer, the security system is implemented by software loaded or embedded within the computer.

According to a second aspect of the present invention, there is provided a method of controlling access to of encrypted data, the method comprising encrypting the data with an encryption key, and making copies of the decryption key available to selected persons, the decryption keys being associated with a propagation control word, and wherein in response to an instruction to send the decryption key to a specified recipient, the propagation control word is checked to determine whether the propagation of the decryption key is allowed, and if so the control word is modified and then the decryption key and the control word are encrypted with the recipient's public key and sent to the recipient.

Advantageously the control word is set by an originator of the encrypted data and the control word is decremented at each propagation, with further propagation of the decryption key being inhibited once the control word reaches a predetermined value. The predetermined value may, for example, be zero.

Preferably each recipient of the key has the ability to modify the control word such that the number of further propagations can be reduced, but not increased.

Encryption and decryption keys can belong to individuals, or can belong to groups of people such that data can be shared amongst those people working, for example, on a particular project.

The hardware component of the system preferably includes a data processor such that encryption and decryption of the decryption key is performed solely within the hardware unit. Additionally the hardware unit may further comprise a non-volatile memory such that the association between an encrypted document or other entity or service and the appropriate decryption key is maintained solely within the hardware unit.

It is thus possible to provide a security system which allows limited propagation of an encrypted document or access thereto, even in an environment where the group of recipients requiring access to that document is not well defined.

BRIEF DESCRIPTION OF THE DRAWINGS

The present invention will further be described, by way of example, with reference to the accompanying drawings, in which.

DETAILED DESCRIPTION OF EMBODIMENT(S)

Figure 1:
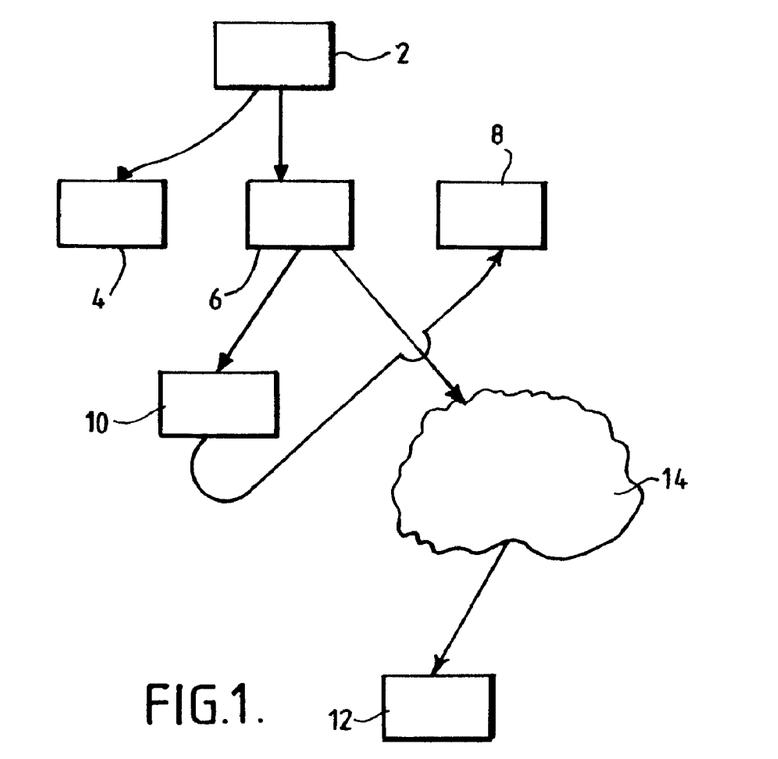
FIG. 1 schematically illustrates a possible propagation path for a sensitive document within a multi-user environment.

FIG. 1 illustrates the arrangement where a originator 2 of a document wishes or needs to share this document with his co-workers 4 and 6. However, for whatever reason, the originator 2 may desire that the document does not reach his colleague 8. However, since workers 4 and 6 have had access to the document, they may then deal with it as they see fit, and worker 6 may for example forward the document on to a further colleague 10 who unaware of the wishes of the originator 2 may then forward the document on to the worker 8. The worker 6 may also e-mail the document to another person 12 via an external telecommunications network 14. Thus the contents of the document have now escaped from the control of the originator and the document may circulate amongst other people outside of the company.

A traditional way to address this problem would be to encrypt the document at the time of transmission to workers 4 and 6. Depending on the security features of the encryption system used, the originator 2 may be able to inhibit further copying or printing of the document by workers 4 and 6. However, if worker 6 has a legitimate need to forward that document onto a colleague 10, then this is clearly inconvenient. However, if the document is encrypted but further copying is permitted, then there is nothing stopping worker 6 forwarding the document on to his colleague 10, who may then of course forward the document on to worker 8.

The inventor has noted that, each time the encrypted document is transmitted to a new recipient, or a person is to be given access to the document, folder to the like there is an opportunity to encrypt the decryption key using the recipient's public key. This gives an opportunity for a security system to monitor the number of times that the decryption key has been propagated and thereby control the level of propagation of the decryption key, and hence the ability to decrypt the encrypted document. Thus, in general terms, the originator of a document 2 may send the document or give access to recipients 4 and 6 and may also set a propagation control value to, for example, 1 thereby indicating that the decryption key can be propagated one more time. Thus, user 6 has the option to re-encrypt the decryption key using the public key of intended recipients to make one further generation copy of the decryption key. Thus, as the decryption key is encrypted with the public key of user 10, the generation (i.e. copy) control word as embedded in the decryption key sent to user 10 is decremented, such that the generation control key received by user 10 has a value of zero. Thus, although user 10 could still send the encrypted document to worker 8, he will not be able to send the decryption key to worker 8 and thus worker 8 is unable to view the document. Similarly, the user 6 still has the ability to send the key to user 12 as this still only represents a further one generation (copy) step on from user 6. However, the originator 2 may also be able to set a copy limit variable which limits the number of times the user 6 can send the decryption key to a next generation user. Thus, if for example the copy control word was set to one, and the generation control word as received by user 6 was set to one, then user 6 could send a further copy of the decryption key to recipient 10, but in so doing the copy control word stored within the security system belonging to user 6 would be decremented such that the ability of user 6 to send a further copy to user 12, even though this would still represent only one further generation of copying, would be inhibited because user 6 had made their quota of copies.

Thus, the originator of a key has the ability to control both the number of "generations" to which the decryption key may be copied and independently the number of times any key may be copied within a single generation, that is the number of times the user may send a key to others.

Figure 2:
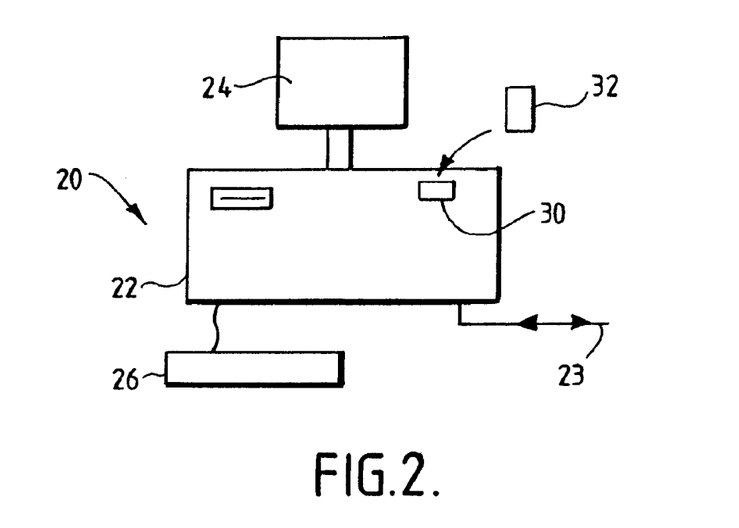
FIG. 2 schematically illustrates a user's computing device as modified to work within a security system constituting an embodiment of the present invention.

FIG. 2 schematically illustrates a computer terminal within a security system constituting an embodiment of the present invention. The computer terminal, generally indicated 20 is in many ways a conventional terminal, such as a standard PC, having a main unit 22 housing a data processor, semiconductor memory, and bulk storage memory, together with various interface cards enabling the computer to communicate with other data processors via a suitable communications network 23 which may be a LAN, a WAN, a dial up connection or any other suitable communication scheme. The data processor also includes a display device 24 and an input device 26, for example a keyboard. A data processor also includes a socket 30 for removably accepting a user security device 32 such that the device 32 can establish data communication with the data processor 20.

Figure 3:
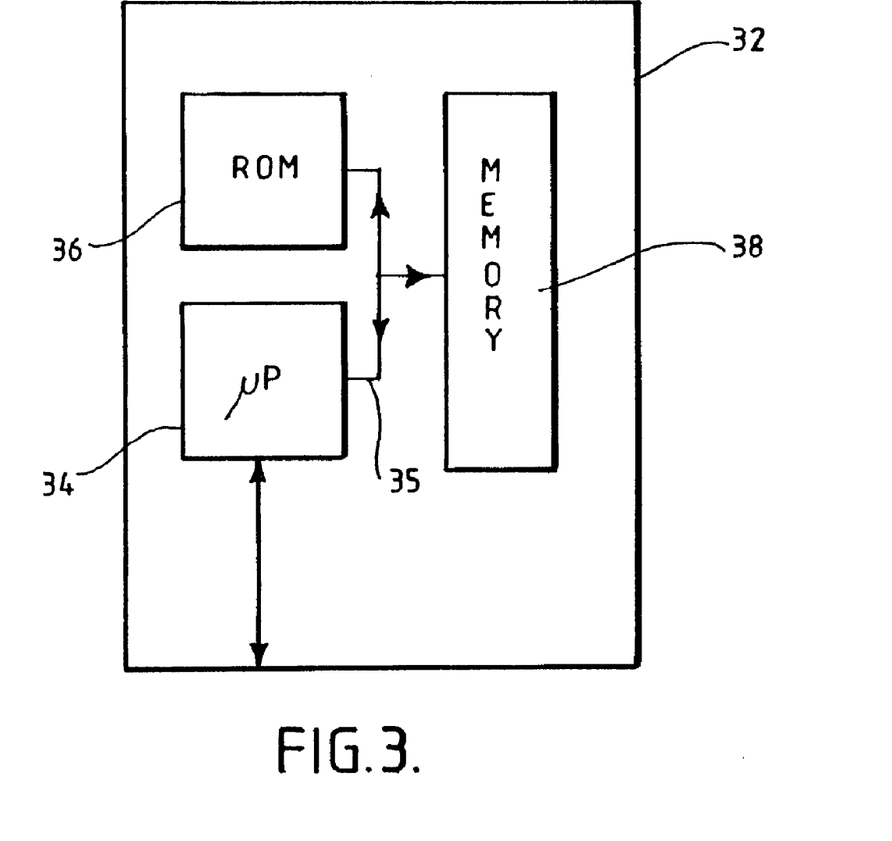
FIG. 3 schematically illustrates the structure of a hardware security device constituting an embodiment of the present invention.

The user's security device 32 is shown in greater detail in FIG. 3. In broad terms, the device comprises an embedded data processor 34 connected via an internal bus 35 to a read only memory 36 containing the executable code for causing the microprocessor 34 to perform encryption and decryption operations and to check the generation and copy control words. The device 32 also includes a non-volatile memory 38 which contains decryption keys and associated identifiers and settings. It should be noted that the internal bus 35 is not directly accessible from outside of the device 32 but all communication is in fact handled via the data-processor 34. This prevents the memory 38 from being interrogated other than by the data-processor 34. Communication between the device 32 and the data processor 20 can be by a bespoke or via standard communications port. Thus, for computers produced around the years 2000 and 2001 the communication is likely to be via a USB interface. The interface can, of course, change dependent on the prevailing interface technology.

Figure 4:
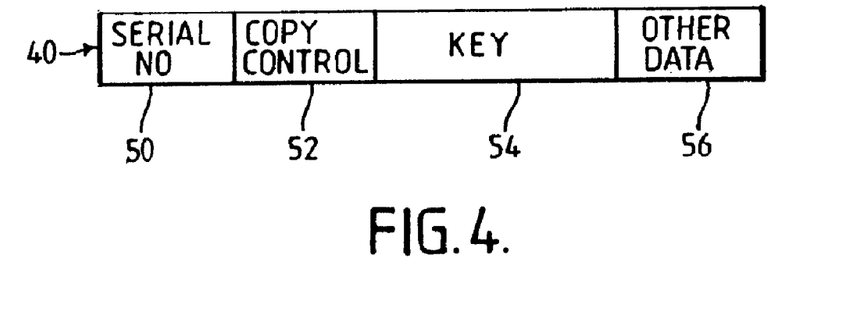
FIG. 4 schematically illustrates the structure of a decryption key associated with a document in a security system constituting an embodiment of the present invention.

FIG. 4 shows the configuration of data within the memory 38 in greater detail. The memory 38 is divided into a series of data units. A single data unit 40 is represented in FIG. 4 and comprises a plurality of elements. A first element 50 is a serial number representing a unique identity of the key. A second portion 52 includes the copy control commands indicating either, or both the number of generations of copies which can be made of the decryption key (i.e. the number of tiers through which it may be copied from user to user), and indeed the number of copies that can be made within a single generation or more. Region 54 contains the decryption key itself and region 56 contains other data, such as the audit trail and any flags or other instructions which may for example concern the need to communicate with persons higher up a data flow path in order to authorize further copying of the decryption key or to inform them that copying of the decryption key has been done.

The security device 32 may be protected to prevent unauthorized access to the data within the memory 38. This may be achieved by password protection, advantageously set to disable the device, or wipe all of the stored decryption keys, after a number of incorrect entries of the password. Password protection may be replaced or augmented by a biometric device such as a finger print reader. This biometric device may form an integrated part of the security device 32, or be provided separately. Password protection may also be replaced or augmented by a smartcard reader incorporated into the device 32. A user inserts/removes a smartcard into the reader to authorize the user. Password protection may also be replaced or augmented by a token reader which permanently holds a token (similar to a mobile phone SIM card) provided by the user, to authorize the user. The user rights required for user authorization are stored along with the decryption keys on the device 32.

Figure 5A:
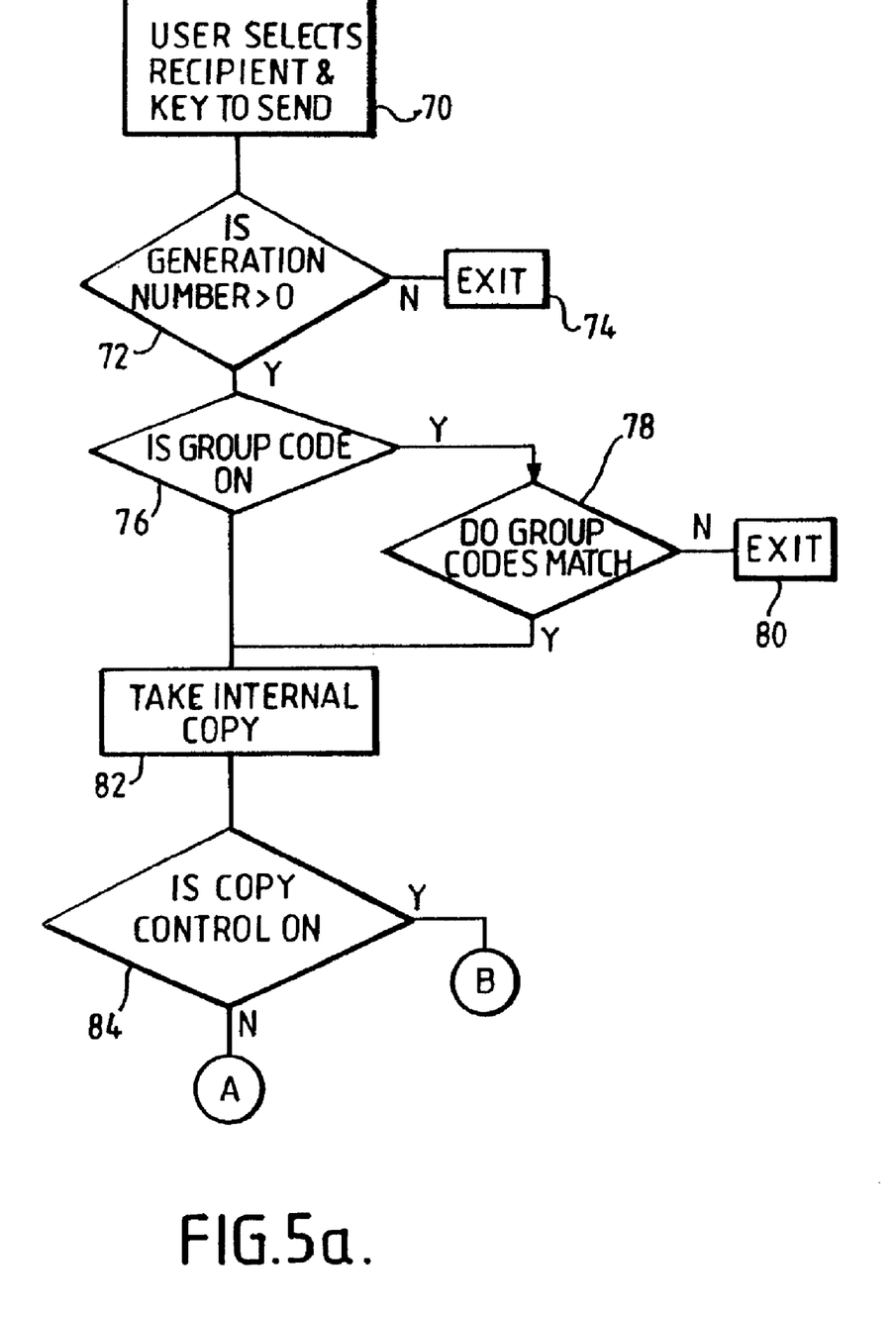
FIGS. 5a and 5b represents a flow chart illustrating the operation of a security system constituting an embodiment of the present invention.
Figure 5B:
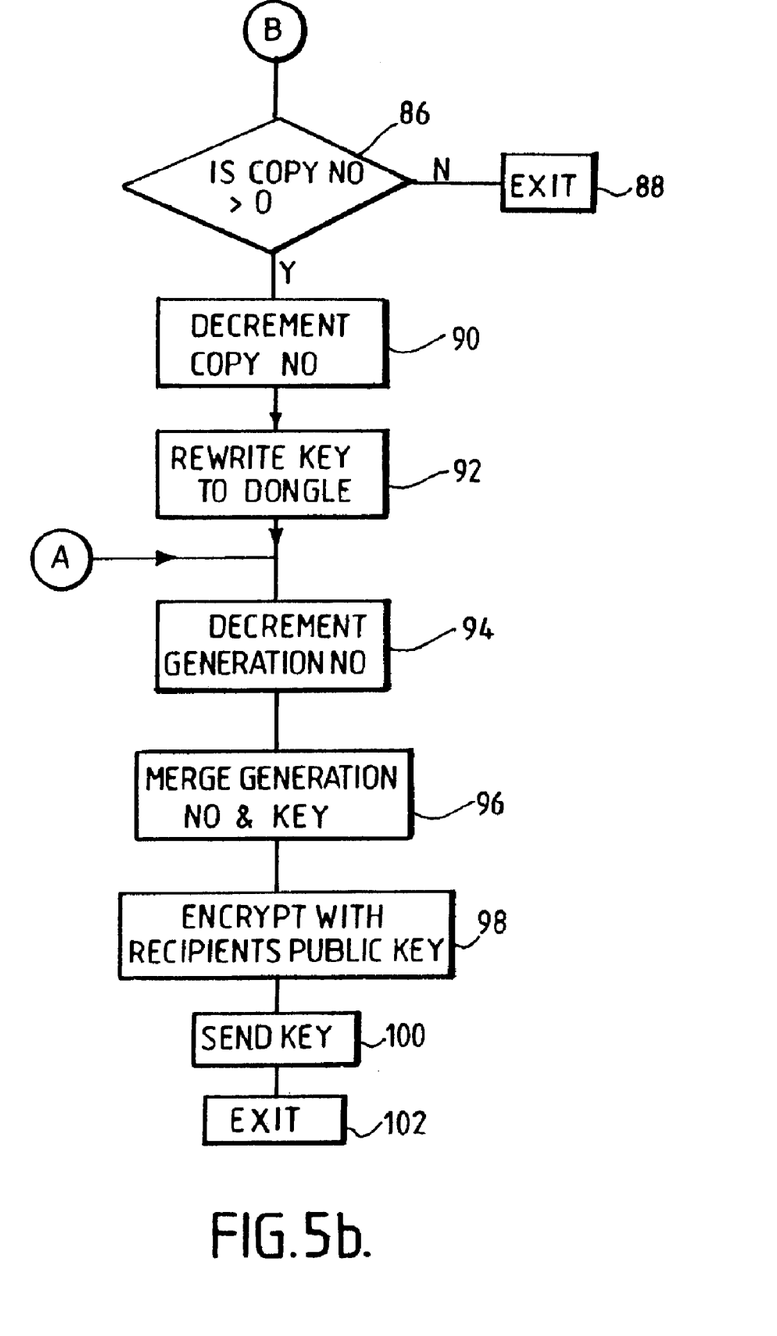

FIGS. 5a and 5b schematically illustrate the operation of an embodiment of the present invention. Initially, control starts at step 70 where it is assumed that a user already has the encryption key, for example the public key, of a recipient which he wishes to send a decryption key to. From step 70, control is passed to step 72 where a test is made to see if the generation number is greater than zero. If the generation number is not greater than zero, then control is passed to step 74 where the procedure is exited. However, if the generation number is greater than zero then control is passed to step 76 where a test is made to see if a "group code flag" has been set. The group code is part of the recipient's public key which indicates which organization they belong to. Thus, the group code can be examined and compared with a pass or deny list in order to determine whether the recipient is entitled to receive the decryption key. If the group code flag is set, control is passed to step 78, whereas if the flag is not set control is passed to step 82.

Step 78 compares the group code embedded in the key which the user wishes to send with the group code of the recipient. If the codes match, or lie within an acceptable range of codes, then control is passed to step 82, otherwise control is passed to step 80 where the procedure is terminated. An internal copy of the key which the user wishes to send is made at step 82 and control is then passed to step 84 where a test to see whether a copy control counter is set. If the copy control counter is set, then control is passed to step 86 whereas, if it is not, control is passed to step 94 as shown in FIG. 5b.

A test is made at step 86 to see if the copy number is greater than zero. If it is not, then control is passed to step 88 where the procedure is exited. However, if the copy control number is greater than zero then control is passed to step 90 where the copy control number is decremented, and then to step 92 where the modified copy of the key including the decremented copy controlled number is rewritten back to the dongle. Control then proceeds to step 94 where the generation number is decremented, and then the modified generation number is merged with the key at step 96. From step 96, control is passed to step 98 where the key and modified generation and/or copy numbers are encrypted with the recipient's public key. Control is then passed to step 100 where the key is sent to the recipient. The procedure finishes at step 102.

The above system has been described in terms of allowing access to documents, but could equally apply to access to services, folders, executable files, web pages and so on. Thus one or more documents, some of which may not have yet been generated may be encrypted using the key and shared amongst users.

It would also be possible to use the system to control access to updates to a journal service or the like for a period of time.

Furthermore, although the invention has been described in the context of controlling the propagation of decryption keys, it is equally applicable to controlling the propagation of other security measures such as encryption keys, keys for encryption and decryption, passwords, messages and other electronic "objects" where the ability to propagate that "object" needs to be restricted.

It is thus possible to provide a security system for controlling the extent of propagation of keys.

Figure 6:
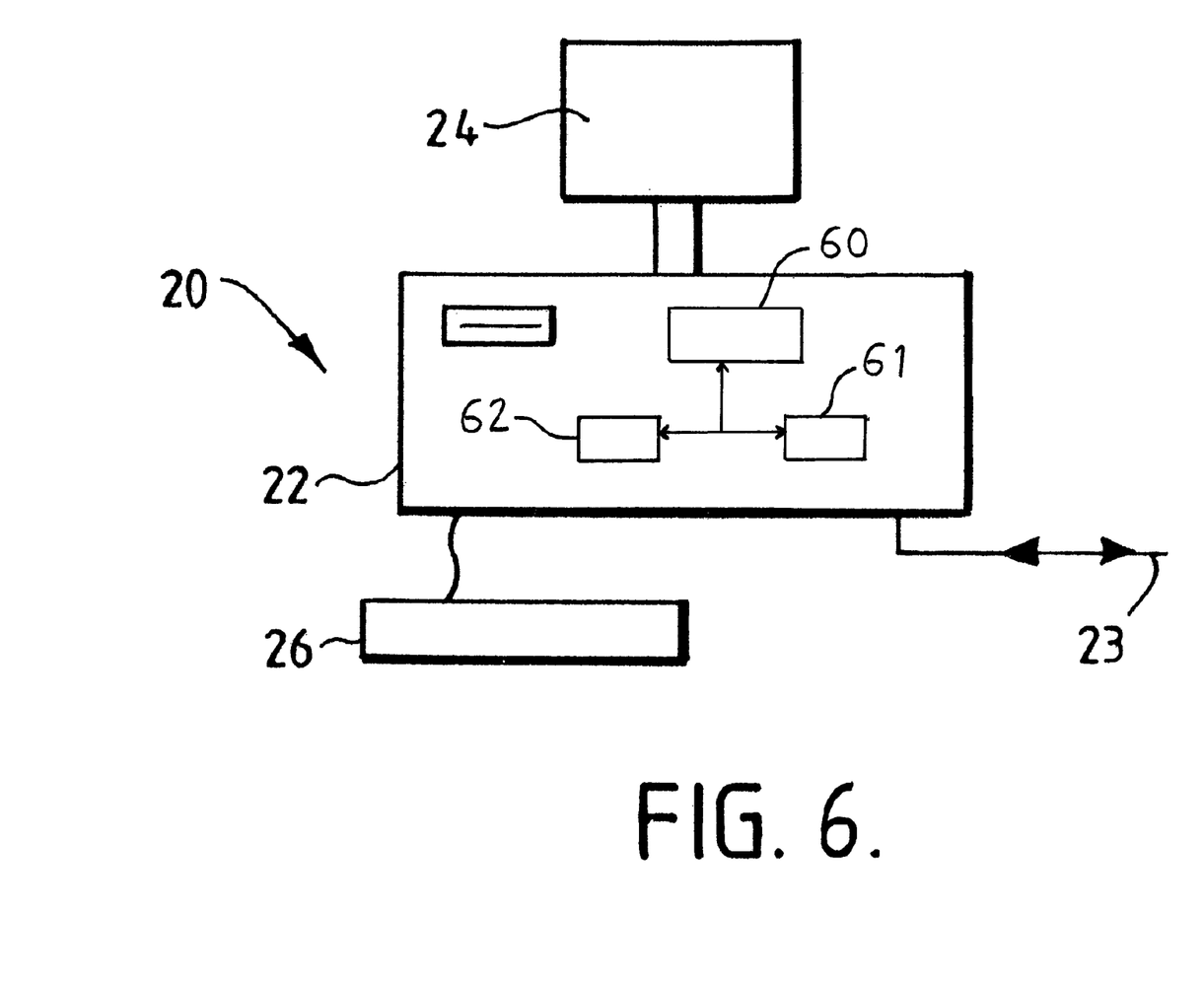
FIG. 6 schematically illustrates a computing device constituting a second embodiment of the present invention.

In the embodiment of the invention described above with reference to FIGS. 1-5b, a hardware security device 32 (such as a USB dongle) is used to perform encryption and decryption operations and to check the generation and copy control words. The device 32 also includes a non-volatile memory 38 which contains decryption keys and associated identifiers and settings. In a second embodiment of the invention shown in FIG. 6, the device 32 is omitted, and the functions of the device 32 are performed by software loaded or embedded within the main unit 22. Specifically, the software is loaded or embedded on a semiconductor memory 61 and bulk storage memory 62, and executed by a processor 60.

The data unit shown in FIG. 4 is stored in the memory 61 and/or the memory 62 in an encrypted form as an encrypted key file. Decryption of the key file can be performed by the processor 60 after a user enters a password via keyboard 26. As with the hardware device embodiment described above with reference to FIG. 2, password protection may be replaced or augmented by another form of security such as a biometric reader, smartcard reader or token reader.

Although the invention has been described above with reference to one or more preferred embodiments, it will be appreciated that various changes or modifications may be made without departing from the scope of the invention as defined in the appended claims.

What is claimed is:

1. A security system for controlling access to encrypted information, comprising:
a memory for storing at least one decryption key for use in decrypting an encrypted item of information, the decryption key being associated with a security code which can be used to determine whether the security system is authorized to send encrypted copies of the decryption key to others, wherein if the security system is authorized to send an encrypted copy of the decryption key, it encrypts the decryption key and propagates the encrypted copy of the decryption key, wherein each time the security system propagates a decryption key, it includes as part of the decryption key an identifier indicating the identity of a sender's key, and wherein a user can append a control word against their identity in the decryption key to instruct the security system to initiate a message to them or an agent informing them of the propagation of the key and giving information concerning that propagation.

2. The security system of claim 1, wherein if the security system is authorized to send an encrypted copy of the decryption key to a first entity, it encrypts the decryption key using an encryption key associated with the first entity.

3. The security system of claim 2, wherein the decryption key is encrypted with a public key of the first entity.

4. The security system of claim 1, wherein each time the security system sends a decryption key to another entity, it modifies the security code associated with the decryption key and sends the modified security code as part of the encrypted decryption key.

5. The security system of claim 4, wherein the security code is a numeric value indicating the number of times the encryption key can be propagated, and the security code is decremented each time the decryption key is propagated to a further entity.

6. The security system of claim 1, wherein the decryption key is stored within the memory in an encrypted form.

7. The security system of claim 1, wherein the decryption key includes an audit trail of individuals who have allowed propagation of the key.

8. A method of controlling the propagation of a decryption keys that allows access to encrypted data, the method comprising the steps of: associating a propagation control word with a decryption key for an item of data, and in response to an instruction to send the key to a specified recipient, checking the status of the control word to determine if propagation is allowed, and if so, modifying the control word and encrypting the control word and decryption key with a recipient's public key and sending the encrypted key, including as part of the decryption key an identifier indicating the identity of a sender's key, and appending a control word against a user's identity in the decryption key to instruct a security system to initiate a message to them or an agent informing them of the propagation of the key and giving information concerning that propagation.

9. The method of claim 8, wherein the control word is a numeric value which is decremented at each propagation, and wherein in which propagation is inhibited once the numeric value reaches a predetermined value.

10. The method of claim 8, wherein an originator of the decryption key sets a maximum number of times the key can be sent, and each time a key is sent, a variable holding a generation number of the key is modified such that when the generation number reaches the maximum number of times the key can be sent, further sending of the key is inhibited.

11. A security system for controlling access to encrypted information by a plurality of users, comprising a memory for storing at least one data unit comprising a decryption key and an associated security code, in which the decryption key is used in decrypting an encrypted item of information and the security code controls the number of times that the decryption key can be propagated, and the security system examines the security code which code includes a group code as an indication of an acceptable range of recipients to determine whether it is authorized to send encrypted copies of the decryption key to those recipients, wherein if the security system is authorized to send an encrypted copy of the decryption key, it encrypts the decryption key and propagates the encrypted copy of the decryption key.

12. The security system of claim 11, wherein if the security system is authorized to send an encrypted copy of the decryption key to a first entity, it encrypts the decryption key using an encryption key associated with the first entity.

13. The security system of claim 12, wherein the decryption key is encrypted with a public key of the first entity.

14. The security system of claim 11, wherein each time the security system sends a decryption key to another entity, it modifies the security code associated with the decryption key and sends the modified security code as part of the encrypted decryption key.

15. The security system of claim 14, wherein the security code is a numeric value indicating the number of times the encryption key can be propagated, and the security code is decremented each time the decryption key is propagated to a further entity.

16. The security system of claim 11, wherein each time the security system propagates a decryption key, it includes as part of the key an identifier indicating the identity of the sender's key.

17. The security system of claim 11, wherein the decryption key includes an audit trail of individuals who have allowed propagation of the key.

18. The security system of claim 11, wherein a user can append a control word against their identity in the decryption key to instruct the security system to initiate a message to them or an agent informing them of the propagation of the key and giving information concerning that propagation.

19. A method of controlling the propagation of decryption keys to a plurality of users for allowing access to encrypted data, comprising the steps of storing at least one data unit in a memory, the at least one data unit comprising a decryption key, including a propagation control word with the decryption key in the data unit, and in response to an instruction to send the data unit to a specified recipient, checking the status of the control word to determine if propagation is allowed, including checking that the specified recipient is within an acceptable range of recipients indicated as a group code in the control word, and if so, modifying the control word and encrypting the data unit comprising the control word and decryption key with a recipient's public key and sending the data unit.

20. The method of claim 19, wherein the control word is a numeric value which is decremented at each propagation, and wherein propagation is inhibited once the numeric value reaches a predetermined value.

21. The method of claim 19, wherein an originator of the decryption key sets a maximum number of times the key can be sent, and each time the key is sent, a variable holding a generation number of the key is modified such that when the generation numbers reaches the maximum number of times the key can be sent, further sending of the key is inhibited.

22. The method of claim 19, wherein the data unit is stored within the memory in an encrypted form.

* * * * *